United States Patent Office 2,812,290
Patented Nov. 5, 1957

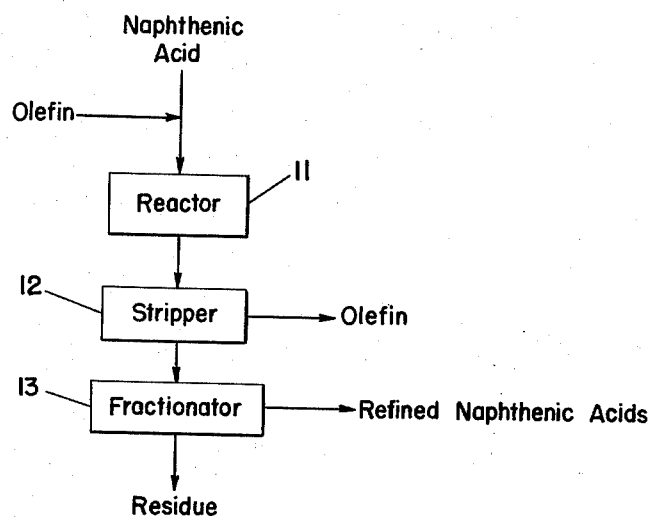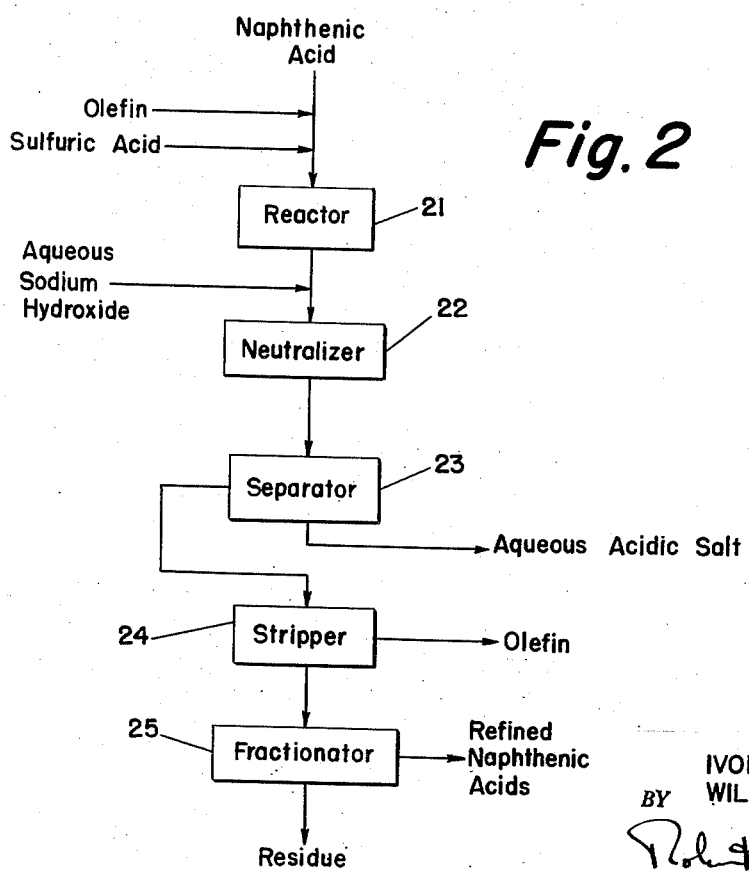

2,812,290

NAPHTHENIC ACID TREATMENT

Ivor W. Mills, Glenolden, and William A. Gallup, Media, Pa., assignors to Sun Oil Company, Philadelphia, Pa., a corporation of New Jersey Application June 1, 1954, Serial No. 433,574

10 Claims. (Cl. 202—57)

This invention relates to the treatment of naphthenic acids to improve the properties thereof including color stability characteristics.

Naphthenic acids are recovered from mineral oil in accordance with procedures known to those skilled in the art of petroleum refining. In general, such acids are either very dark in color initially, or turn very dark after being stored for a short time, and contain substantial quantities of constituents which react with bromine according to the bromine number determination of A. S. T. M. D 1158–52T. A light, stable color and a low bromine number are both important and desirable properties of naphthenic acids in many applications.

In accordance with the present invention, properties of naphthenic acids are improved by subjecting these acids to alkylation treatment with olefin hydrocarbon. We have found that naphthenic acids of improved color stability and decreased bromine number are obtained through contacting these acids with olefin hydrocarbon at alkylating conditions in the presence of an alkylation catalyst. It is believed that the olefins react with active, unsaturated constituents contained in the naphthenic acids, which constituents are deleterious to the properties of the naphthenic acids, to form alkylation products of increased boiling range; naphthenic acids improved in properties may then be separated from the alkylation products by distillation. The process of this invention may be applied to naphthenic acids of substantially any degree of refinement although it is desirable that the acids so treated contain but a minor portion of oil, for example, 25% by weight or less, or more preferably less than 15% by weight.

The olefinic hydrocarbon contact material used in carrying out this invention may be substantially any olefin or mixture of olefins which will react with the deleterious naphthenic acid constituents to form reaction products of such increased boiling range as to be separable by distillation from a substantial portion and preferably from a predominance of the refined naphthenic acids. Olefins containing 4 to about 30 carbon atoms per molecule may be used, with the $C_8$ to $C_{16}$ olefins being preferred. Both straight chain and branched chain olefins may be used; diolefins may be used as well as mono-olefins, although use of the latter is preferred; lower molecular weight fractions resulting from the polymerization of simple olefins as, for example, propylene trimer and tetramer may conveniently be utilized. An aromatic olefin such as styrene can also be employed. The olefin contact material is preferably liquid at the alkylation conditions but sufficiently low boiling that unreacted olefin may readily be stripped from the reaction mixture upon completion of the desired alkylation. The following are examples of preferred olefins which are suitable for use singly or in admixture in the practice of this invention: diisobutylene, $C_9$ olefins, the trimer fraction from propylene polymerization, $C_{10}$ olefins, $C_{11}$ olefins, $C_{12}$ olefins, the propylene tetramer cut, $C_{13}$ olefins, $C_{14}$ olefins, $C_{15}$ olefins, propylene pentamer, butylene tetramer and the like.

The alkylation reaction is conducted by utilizing a suitable alkylation catalyst. Sulfuric acid or "solid phosphoric acid" is preferred as the catalyst although other alkylation catalysts, as for example HF, $BF_3$, $AlCl_3$, and the like, may also be used. Solid phosphoric acid catalyst, as referred to above, is the commercial catalyst material used widely in olefin polymerization reactions and formed by contacting a siliceous adsorbent such as kieselguhr with phosphoric acid and calcining the resulting mixture to form the solid catalyst material. The alkylation may be conducted over a wide range of conditions depending upon the catalyst, the olefin reactant, and to some extent upon the degree of refinement of the naphthenic acids so-treated. Generally, when using the preferred catalysts, the contact temperature should be above 100° F. but below about 400° F.; temperatures in the range of about 150° F. to 350° F. are usually preferable when using solid phosphoric acid catalyst, while somewhat lower temperatures for example 100° F. to 200° F. are preferred with sulfuric acid catalyst. The reaction may generally be conducted at low pressure as for example 1 atmosphere although higher pressures may upon occasion be utilized to advantage. In general, the reaction conditions should be as mild as possible while still effective to cause the desired reaction, in order to avoid possibility of naphthenic acid decomposition.

When utilizing sulfuric acid as the alkylation catalyst, it is necessary to employ sulfuric acid of about 95% by weight or greater strength. Sulfuric acid of higher water content is undesirable because it tends to catalyze a fragmentation or depolymerization of the olefin reactant along with the desired alkylation reaction.

The relative amount of olefinic hydrocarbons which should be contacted with the naphthenic acids will vary depending upon the original quality of the naphthenic acids. A suitable molar ratio of naphthenic acids to olefin reactant usually will be in the range of 40:1 to 2:1 mols of naphthenic acids per mol of olefin although ratios in the range of about 100:1 to 1:1 may be employed. Low quality naphthenic acid fractions require the greater amount of olefin reactant. Too great an excess of olefin should be avoided since excess olefin material may tend to polymerize and thus be consumed in a manner other than by the desired alkylation reaction.

The manner in which the reaction is conducted and the amount of catalyst utilized in carrying out the invention depend to a large degree upon the catalyst used. With a solid catalyst such as solid phosphoric acid, the olefin and naphthenic acids may be mixed and then percolated through a bed of the catalyst at liquid hourly space rates of from about 0.5 to 10.0 volumes of liquid feed per volume of catalyst per hour. Liquid hourly space rates of from about 1.0 to 4.0 are generally preferred.

With a liquid catalyst such as sulfuric acid, the reaction may be conducted by mixing catalyst, olefin and naphthenic acid and agitating the mixture for a desired time. Generally amounts of the sulfuric acid catalyst comprising about 1 to 3% by volume of the reaction mixture are sufficient to catalyze the desired alkylation reaction although greater amounts, for example, up to about 10% by volume of the reaction mixture may be used when treating naphthenic acids of very poor quality. Reaction times when using sulfuric acid may vary from about 5 minutes to 2 hours, with a reaction time of 30 minutes to one hour generally being preferred. It is desirable to remove a major part of the sulfuric acid catalyst before subjecting the reaction mixture to distillation for separating refined naphthenic acids; this catalyst separation is preferably accomplished by partial neutralization of the sulfuric acid with aqueous caustic soda followed by settling and separation of a lower aqueous acidic salt layer. The important conditions of this sulfuric acid separation will be discussed more fully hereinafter.

After the alkylation reaction and separation of the reaction mixture from the catalyst, unreacted olefin is separated therefrom as by steam stripping. The remaining naphthenic acid-alkylation product mixture is then subjected to vacuum distillation to separate refined naphthenic acids having improved color stability and lessened bromine number as distillate. If desired several distillate fractions comprising naphthenic acids of different grades may be obtained.

Reference is now made to the attached Figs. 1 and 2 which illustrate in simple diagrammatic form embodiments of the invention, Fig. 1 illustrating an embodiment utilizing solid phosphoric acid as catalyst, and Fig. 2 illustrating an embodiment utilizing sulfuric acid as catalyst.

Referring now to Fig. 1, naphthentic acids having poor color stability and high bromine number are mixed with normally liquid olefin hydrocarbon, as for example, propylene trimer or tetramer. A ratio of about 40:1 to 2:1 mols of naphthenic acids per mol of olefin, for example 5:1, is generally suitable although ratios in the range of about 100:1 to 1:1 may be employed depending on the quality of the naphthenic acids to be treated. This mixture is passed then to reactor 11 wherein is contained solid phosphoric acid catalyst. Reactor 11 may be any apparatus which is suitable for allowing passage of liquid through a bed of solid catalyst particles. The olefin-naphthenic acid mixture is percolated through the solid phosphoric acid at a liquid hourly space rate of about 1.0 to 4.0 volumes of liquid feed per volume of catalyst per hour with the contact temperature being maintained in the range of about 150° F. to 350° F.

The resulting reaction mixture comprising naphthenic acids, unreacted olefin, and the alkylation reaction products is removed from reactor 11 and passed to stripper 12 wherein unreacted olefin is separated from the remainder of the reaction mixture as by steam stripping.

The mixture of naphthenic acids and alkylation reaction products is then passed to fractionator 13 wherein by vacuum distillation refined naphthenic acids are separated as a distillate fraction or fractions from the alkylation reaction products. These refined acids, which may comprise 80% or more of the naphthenic acids charged, are improved in color stability and bromine number.

One ton of the solid phosphoric acid catalyst generally may be used to treat about 1000 to 2000 barrels of naphthenic acids before the activity of the catalyst drops to an uneconomic level.

Turning now to Fig. 2, naphthenic acids having poor color stability and high bromine number are contacted in reactor 21 with suitable olefin reaction material such as, for example, propylene trimer or tetramer, in the presence of 95% sulfuric acid catalyst. A suitable mol ratio of naphthenic acids to olefin is generally about 40:1 to 2:1, for example 5:1, although ratios in the range of 100:1 to 1:1 may be employed depending on the quality of the naphthenic acids to be treated; the sulfuric acid catalyst comprises about 1–3% by volume of the contact mixture. The alkylation reaction is conducted at a suitable alkylating temperature, for example, in the range of about 150° F. to 165° F. for 30 minutes to 1 hour, with the contact materials maintained in the liquid phase and continually agitated during the contact.

The resulting mixture which comprises sulfuric acid catalyst, unreacted olefin, naphthenic acids, and alkylation reaction products is removed from reactor 21 and subjected to treatment for the removal of sulfuric acid catalyst and unreacted olefin before distillation of refined naphthenic acids from the alkylation reaction products.

It has been found in this embodiment of the invention that in order to obtain refined naphthenic acids with the most improved color stability by subsequent distillation, a predominance but not all of the sulfuric acid catalyst should be removed from the alkylation reaction mixture. The amount of sulfuric acid remaining in the reaction mixture should be equivalent to about 1 to 10 and preferably 1 to 4 mg. of KOH per gram. Naphthenic acids distilled from mixtures containing an equivalent amount of sulfuric acid greater than above specified, turn dark in color due to the presence therein of excessive amounts of $SO_3$ and $SO_2$ which are formed during the distillation and carried over with the distillate naphthenic acids. However, naphthenic acids distilled from mixtures from which all the sulfuric acid catalyst has been removed, although having somewhat improved color stability, do not have as good stability as those acids recovered from mixtures which contain the preferred minor amount of sulfuric acid.

Referring further to Fig. 2, the mixture resulting from the alkylation in reactor 21 is subjected to treatment to remove sulfuric acid catalyst, leaving in the resulting mixture sufficient catalyst to maintain the desired mineral acidity of about 1 to 10 and preferably 1 to 4 mg. of KOH per gram. In this embodiment of the invention, the alkylation reaction mixture from reactor 21 is mixed with aqueous sodium hydroxide in amount sufficient to neutralize a substantial proportion but not all of the sulfuric acid catalyst.

The resulting mixture is agitated in neutralizer 22 and then passed to separator 23 wherein the mixture is settled to separate a lower acidic salt layer comprising $Na_2SO_4$, water, and $H_2SO_4$ from an upper layer comprising naphthenic acids, unreacted olefin, alkylation reaction products and a minor amount of $H_2SO_4$ generally in the range equivalent to about 1–10 mg. of KOH per gram. The layers are separated as by decantation and the upper naphthenic acid layer is passed to stripper 24 wherein the unreacted olefin is removed as by vacuum and/or steam stripping from the naphthenic acids and reaction products.

In place of the above caustic neutralization procedure, water washing may be utilized to separate the desired amount of sulfuric acid catalyst from the alkylation reaction mixture. This alternate procedure is not shown in Fig. 2.

The mixture of naphthenic acids and alkylation reaction products, which also contains sulfuric acid as above specified, is passed from stripper 24 to fractionator 25 wherein by vacuum distillation refined naphthenic acids are separated from the products of the alkylation reaction. These refined naphthenic acids may comprise 80% or more of the naphthenic acids charged to the process and are improved in properties including color stability and bromine number.

The following examples illustrate the invention:

*Example 1*

De-oiled, vacuum distilled naphthenic acids having an acid No. of about 158 were admixed with propylene tetramer to form a mixture comprising about 11.8% by volume of tetramer and 88.2% by volume of naphthenic acids. About 3400 cc. of this mixture was percolated through 500 cc. of solid phosphoric acid catalyst at a rate of about 1000 cc. per hour. The liquid hourly spaced velocity was about 2 volumes of charge per volume of catalyst per hour, and the contact temperature was maintained at about 212° F.

The thus treated liquid mixture was then stripped to separate unreacted olefin. The remainder of the mixture, comprising naphthenic acids and products of the alkylation, was vacuum distilled and a 5% to 70% by volume distillate fraction having an acid No. of about 170 and a bromine No. of 4.6 was collected. This distillate fraction was aged at 150° F. while exposed to air.

De-oiled vacuum distilled naphthenic acids similar to those charged above were vacuum distilled without being treated according to this invention. A 0 to 70% by volume distillate fraction having an acid No. of about 168 and a bromine No. of 7.6 was collected. This distillate fraction was aged at 150° F. while exposed to air.

The following table summarizes the results obtained:

|  | Not Treated | Treated |
|---|---|---|
| Distillate Fraction, Percent of Charge | 0-70 | 5-70 |
| Acid No. | 168 | 170 |
| Bromine No. | 7.6 | 4.6 |
| NPA Color: |  |  |
| Initial | 3½ | 2¼ |
| 1 Day Aging | 6 |  |
| 3 Day Aging | ¹ T. D. |  |
| 20 Day Aging |  | 5¼ |

¹ Too dark.

From the above table it may be seen that the naphthenic acids treated in accordance with this invention retained light color after prolonged accelerated aging while similar naphthenic acids not so treated darkened very rapidly under the accelerated aging conditions. The treated naphthenic acids also had substantially lessened bromine number as compared to those not treated according to the invention.

*Example II*

De-oiled naphthenic acids having an acid No. of about 130 mg. of KOH per gram were contacted with propylene trimer at reactive conditions. The reaction mixture comprised about 30% by volume of trimer and 67% by volume of naphthenic acids, the remaining 3% being sulfuric acid catalyst of 95% concentration. The contact was conducted at a temperature of about 120° F. for 1 hour. Aqueous sodium hydroxide was then introduced into the reaction mixture in amount equivalent to that required to neutralize about 50% of the sulfuric acid catalyst. The resulting mixture was agitated and then settled, and a lower aqueous acidic salt layer was withdrawn. The remainder of the mixture was stripped to removed unreacted trimer and then vacuum distilled. A naphthenic acid distillate fraction was collected which comprised a 6.5 to 32.5% by volume cut of the charge and which had an acid No. of 170. This distillate cut was aged at 150° F. while exposed to air.

De-oiled naphthenic acids similar to those charged above were vacuum distilled without being subjected to the alkylation treatment according to the invention, and 10% by volume distillate fractions collected. These distillate fractions were aged at 140° F. while exposed to air.

The following table summarizes the data obtained:

| Distillate Fraction, Percent of Charge | Not Treated | | | | Treated |
|---|---|---|---|---|---|
|  | 0-10 | 10-20 | 20-30 | 30-40 | 6.5-32.5 |
| Acid No. | 204 | 179 | 163 | 142 | 170 |
| NPA Color: |  |  |  |  |  |
| Initial | 3 | 3½ | 3- | 4- | 2¼ |
| 1 Day Aging | 8 | ¹ T. D. | ¹ T. D. | 6½+ |  |
| 3 Days Aging |  |  |  |  | 3- |
| 4 Days Aging | ¹ T. D. |  |  | ¹ T. D. |  |
| 9 Days Aging |  |  |  |  | 4½ |
| 20 Days Aging |  |  |  |  | 5½ |

¹ Too dark.

From the above table it may be seen that the naphthenic acids treated in accordance with this invention retained light color after prolonged accelerated aging while similar naphthenic acids not so treated darkened very rapidly even though the accelerated aging conditions were less severe (140° F. instead of 150° F.).

*Example III*

De-oiled, vacuum distilled naphthenic acids were treated by this invention in a manner similar to that shown in Example II. Propylene trimer was used as the olefin contact material, and 95% sulfuric acid was used to catalyze the alkylation reaction. A refined naphthenic acid fraction comprising a 10% to 60% by volume cut of the charge was obtained by distillation from the alkylation reaction products. This refined acid fraction had a bromine No. of 4.6 and a sap. No. of 182.

De-oiled, vacuum distilled naphthenic acids similar to those charged above were redistilled without being treated by this invention, and various distillate fractions were collected.

The following table summarizes the results obtained:

|  | Distillate Fraction, Percent of Charge | Sap. No. | Bromine No. |
|---|---|---|---|
| Treated Naphthenic Acids | 10-60 | 182 | 4.6 |
| Non-Treated Naphthenic Acids | 10-20 | 186 | 8.4 |
|  | 20-30 | 185 | 7.8 |
|  | 30-40 | 179 | 7.7 |
|  | 40-50 | 172 | 7.2 |
|  | 50-60 | 162 | 7.9 |

It may be seen from the above results that the naphthenic acids treated by this invention had a substantially lower bromine number than similar naphthenic acids not so treated.

We claim:

1. The method of refining petroleum naphthenic acids containing undesirable constituents which comprises: contacting naphthenic acids containing said undesirable constituents with an olefin hydrocarbon containing from 4 to 30 carbon atoms per molecule in the presence of an alkylation catalyst under alkylation conditions whereby said olefin hydrocarbon reacts with said undesirable constituents, and separating from the reaction mixture refined naphthenic acids having improved properties.

2. The method according to claim 1 wherein said olefin hydrocarbon has 8 to 16 carbon atoms per molecule.

3. The method of refining petroleum naphthenic acids containing undesirable constituents reactable with olefin hydrocarbons which comprises: contacting naphthenic acids containing said undesirable constituents with an olefin hydrocarbon containing from 4 to 30 carbon atoms per molecule in the presence of solid phosphoric acid catalyst under alkylation conditions whereby said olefin reacts with said undesirable constituents, and distilling the material thus treated to produce a refined naphthenic acid distillate having improved color stability.

4. The method according to claim 3 wherein said olefin hydrocarbon has 8 to 16 carbon atoms per molecule.

5. The method of refining petroleum naphthenic acids containing undesirable constituents which comprises: contacting naphthenic acids containing said undesirable constituents with olefin hydrocarbon having 8 to 16 carbon atoms per molecule, the ratio of contact materials being in the range of 40:1 to 2:1 moles of naphthenic acids per mole of olefin, at temperatures in the range of 150° F. to 350° F. in the presence of solid phosphoric acid catalyst, and distilling the thus treated material to produce a refined naphthenic acid distillate having improved color stability.

6. The method of refining petroleum naphthenic acids containing undesirable constituents reactable with olefin hydrocarbons which comprises: contacting naphthenic acids containing said undesirable constituents with an olefin hydrocarbon containing from 4 to 30 carbon atoms per molecule in the presence of a sulfuric acid catalyst having an acid strength of at least 95% $H_2SO_4$ by wt. under alkylating conditions whereby said olefin hydrocarbon reacts with said undesirable constituents; removing said sulfuric acid catalyst from the resulting mixture whereby the acidity of said resulting mixture is no greater than 10 mg. of KOH per gram, and distilling the naphthenic acid mixture thus treated to produce a refined naphthenic acid distillate having improved color stability.

7. The method according to claim 6 wherein said olefin hydrocarbon has 8 to 16 carbon atoms per molecule.

8. The method of refining petroleum naphthenic acids, containing undesirable constituents reactable with olefin hydrocarbons which comprises: contacting naphthenic acids containing said undesirable constituents with an olefin hydrocarbon containing from 4 to 30 carbon atoms per molecule in the presence of a sulfuric acid catalyst having an acid strength of at least 95% $H_2SO_4$ by wt. under alkylating conditions whereby said olefin hydrocarbon reacts with said undesirable constituents; introducing aqueous sodium hydroxide into the resulting mixture in an amount sufficient to neutralize a substantial proportion but less than the stoichiometric equivalent of the sulfuric acid catalyst; settling the resulting mixture to form an aqueous acidic salt layer and a naphthenic acid layer which contains sulfuric acid in an amount equivalent to 1 to 10 mg. of KOH per gram; separating the so-formed layers; removing unreacted olefin from the naphthenic acid layer; and distilling the remainder of the naphthenic acid layer to obtain a refined naphthenic acid distillate having improved color stability.

9. The method according to claim 8 wherein said olefin hydrocarbon has 8 to 16 carbon atoms per molecule.

10. The method of refining petroleum naphthenic acids containing undesirable constituents which comprises: contacting naphthenic acids containing said undesirable constituents with olefin hydrocarbon having 8 to 16 carbon atoms per molecule, the ratio of contact materials being in the range of 40:1 to 2:1 moles of naphthenic acids per mole of olefin, at temperatures in the range of 100° F. to 200° F. in the presence of sulfuric acid catalyst having an acid strength of at least 95% $H_2SO_4$ by weight, introducing into the resulting mixture aqueous sodium hydroxide in amount sufficient to neutralize a substantial proportion but less than the stoichiometric equivalent of the sulfuric acid catalyst, settling the resulting mixture to separate an aqueous acidic salt layer from a naphthenic acid layer which contains sulfuric acid in amount equivalent to 1 to 10 mg. of KOH per gram, separately removing the layers, and distilling the treated naphthenic acids to produce a refined naphthenic acid distillate having improved color stability.

References Cited in the file of this patent

UNITED STATES PATENTS

| 2,133,765 | Ewing | Oct. 18, 1938 |
| 2,220,012 | Bruun | Oct. 29, 1940 |
| 2,563,087 | Vesely | Aug. 7, 1951 |

OTHER REFERENCES

"Distillation Literature Index and Abstracts," by A. and E. Rose (1953—Applied Science Labs., Inc.), material under heading "Naphthenic acids," 1 page.